(12) United States Patent
Eguchi

(10) Patent No.: US 8,884,737 B2
(45) Date of Patent: Nov. 11, 2014

(54) CONTROL DEVICE AND COMMUNICATION CONTROL METHOD

(75) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 699 days.

(21) Appl. No.: 12/372,383

(22) Filed: Feb. 17, 2009

(65) Prior Publication Data

US 2009/0237265 A1    Sep. 24, 2009

(30) Foreign Application Priority Data

Mar. 24, 2008    (JP) .................................. 2008-076405

(51) Int. Cl.
| | |
|---|---|
| G05B 19/00 | (2006.01) |
| H04Q 5/22 | (2006.01) |
| H04W 24/00 | (2009.01) |
| G08C 17/00 | (2006.01) |
| H04W 84/18 | (2009.01) |

(52) U.S. Cl.
CPC ............... G08C 17/00 (2013.01); *H04W 84/18* (2013.01)
USPC ........... 340/5.1; 340/5.5; 340/10.1; 340/10.5; 340/572.1; 340/572.3; 455/41.1; 455/67.14; 455/456.2; 455/574

(58) Field of Classification Search
USPC ................. 340/10.1; 455/127.1, 127.5, 343.1, 455/452.2, 434, 450, 502, 41.1, 574, 456.1, 455/456.2, 456.3, 456.5, 456.6, 41.2; 370/315, 322, 462, 336, 338, 310, 350

See application file for complete search history.

(56) References Cited

U.S. PATENT DOCUMENTS

| | | | | |
|---|---|---|---|---|
| 5,525,992 | A * | 6/1996 | Froschermeier | 340/10.2 |
| 6,934,554 | B2 * | 8/2005 | Mizuno et al. | 455/502 |
| 7,720,471 | B2 * | 5/2010 | Ayyagari et al. | 455/426.1 |
| 7,941,149 | B2 * | 5/2011 | Wang et al. | 455/445 |
| 7,957,356 | B2 * | 6/2011 | Wang et al. | 370/338 |
| 7,995,548 | B2 * | 8/2011 | Sakoda | 370/341 |
| 2006/0044113 | A1 * | 3/2006 | Hashimoto et al. | 340/10.1 |

(Continued)

FOREIGN PATENT DOCUMENTS

| | | |
|---|---|---|
| EP | 1748597 A1 | 1/2007 |
| JP | 2007-037138 A | 2/2007 |
| JP | 2007-300414 A | 11/2007 |
| JP | 2007300414 A * | 11/2007 |
| WO | 2007-125807 A | 11/2007 |
| WO | 2007-125807 A1 | 11/2007 |

OTHER PUBLICATIONS

Aug. 27, 2012 Japanese Office Action, without an English Translation, that issued in Japanese Patent Application No. 2008-076405.

(Continued)

*Primary Examiner* — Daniel Wu
*Assistant Examiner* — Mancil Littlejohn, Jr.
(74) *Attorney, Agent, or Firm* — Cowen, Liebowitz & Latman, P.C.

(57) ABSTRACT

This invention eliminates unnecessary beacon transmission by a DBD and suppresses the power consumption of each device included in a wireless communication network. This invention provides a communication control method in a host which wirelessly communicates with a DBD via a wireless USB. The method includes the steps of transmitting a capture packet command to a DBD when it is activated, analyzing a received captured signal and determining the presence/absence of another Wimedia device unrecognized by the host, and upon determining that the other Wimedia device unrecognized by the host exists, instructing the activated DBD to transmit a beacon to implement wireless communication synchronized with the host.

7 Claims, 13 Drawing Sheets

(56) References Cited

U.S. PATENT DOCUMENTS

| | | | |
|---|---|---|---|
| 2007/0026794 A1 | 2/2007 | Ayyagari et al. | |
| 2007/0073935 A1* | 3/2007 | Kim et al. | 710/62 |
| 2007/0086401 A1 | 4/2007 | Hong et al. | |
| 2007/0218921 A1 | 9/2007 | Lee et al. | |
| 2007/0294456 A1* | 12/2007 | Chan et al. | 710/313 |
| 2008/0045159 A1* | 2/2008 | Mashimo et al. | 455/68 |
| 2008/0247366 A1* | 10/2008 | Celentano et al. | 370/338 |
| 2009/0096580 A1* | 4/2009 | Paananen | 340/10.1 |

OTHER PUBLICATIONS

Wireless Universal Serial Bus Specification. Agere, Hewlett-Packard, Intel Microsoft, NEC, Philips, Samsung. May 12, 2005. Revision1.0.

Sep. 20, 2012 Chinese Office Action, with English Translation, that issued in Chinese Patent Application No. 200910119378.2.

Apr. 16, 2013 European Search Report of the counterpart European Patent Application No. 09153216.8.

* cited by examiner

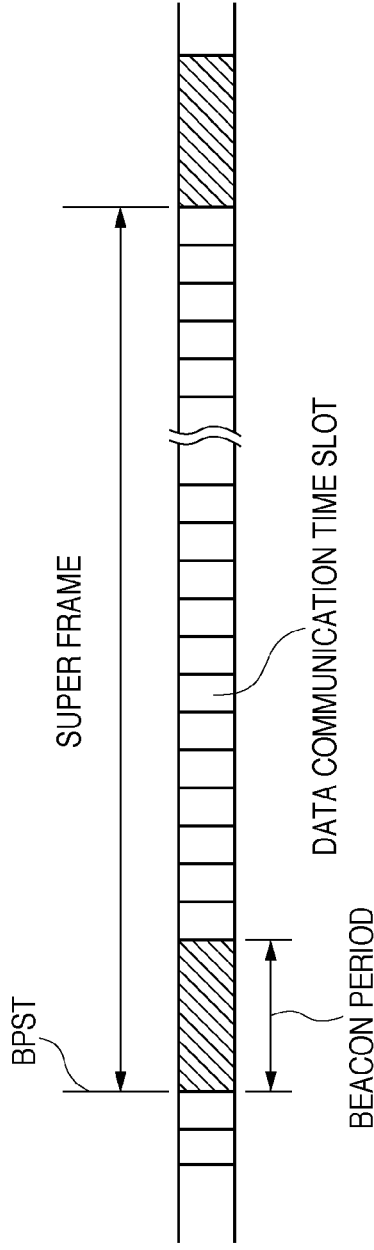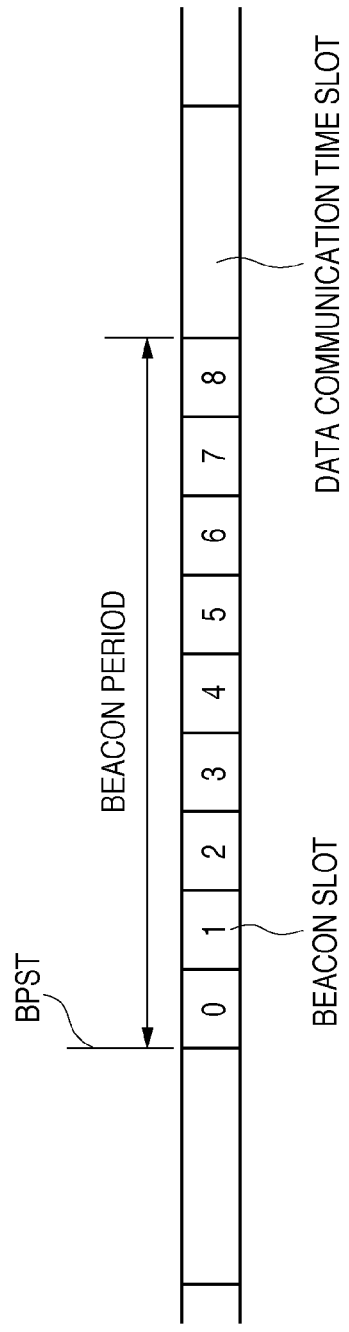

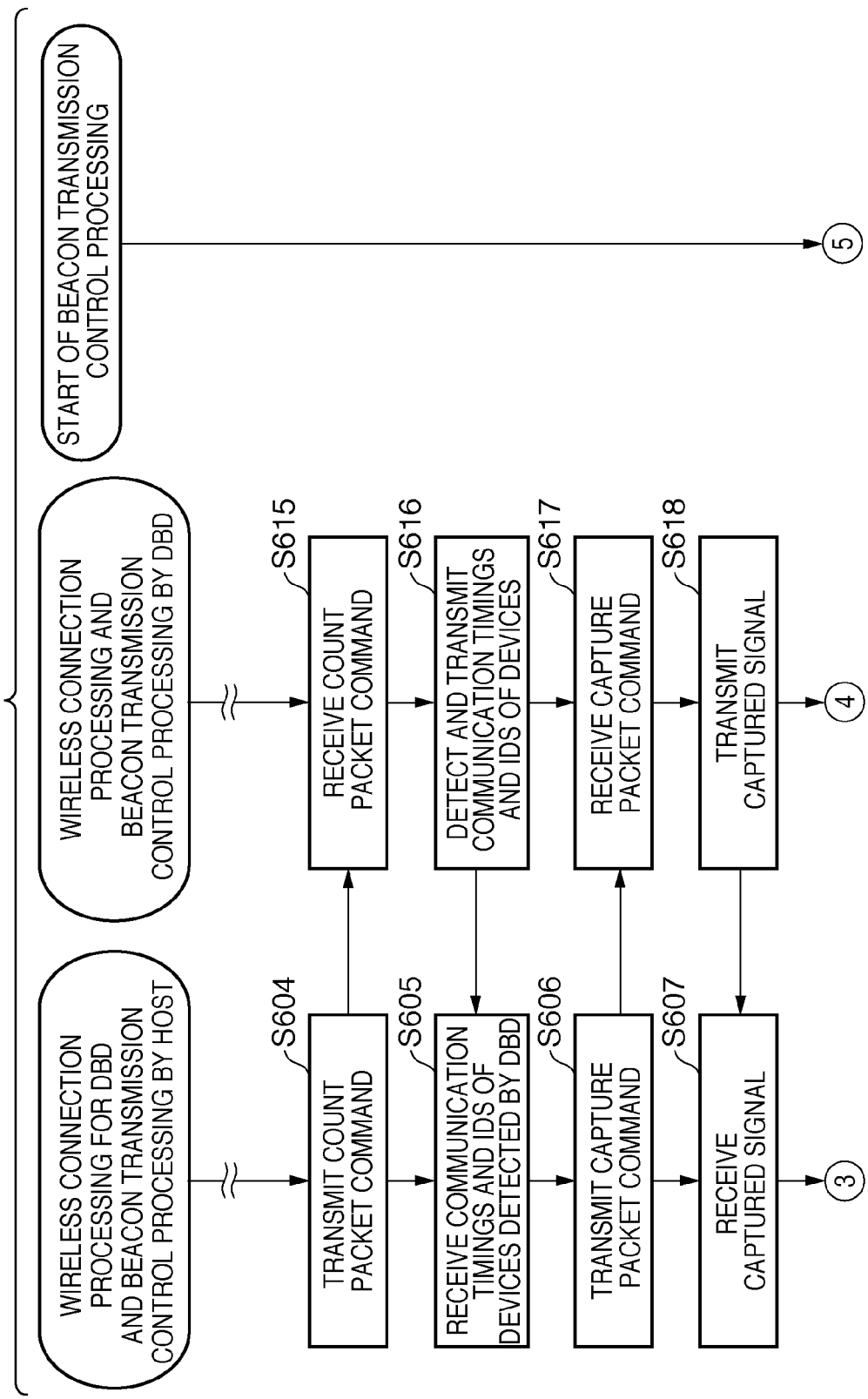

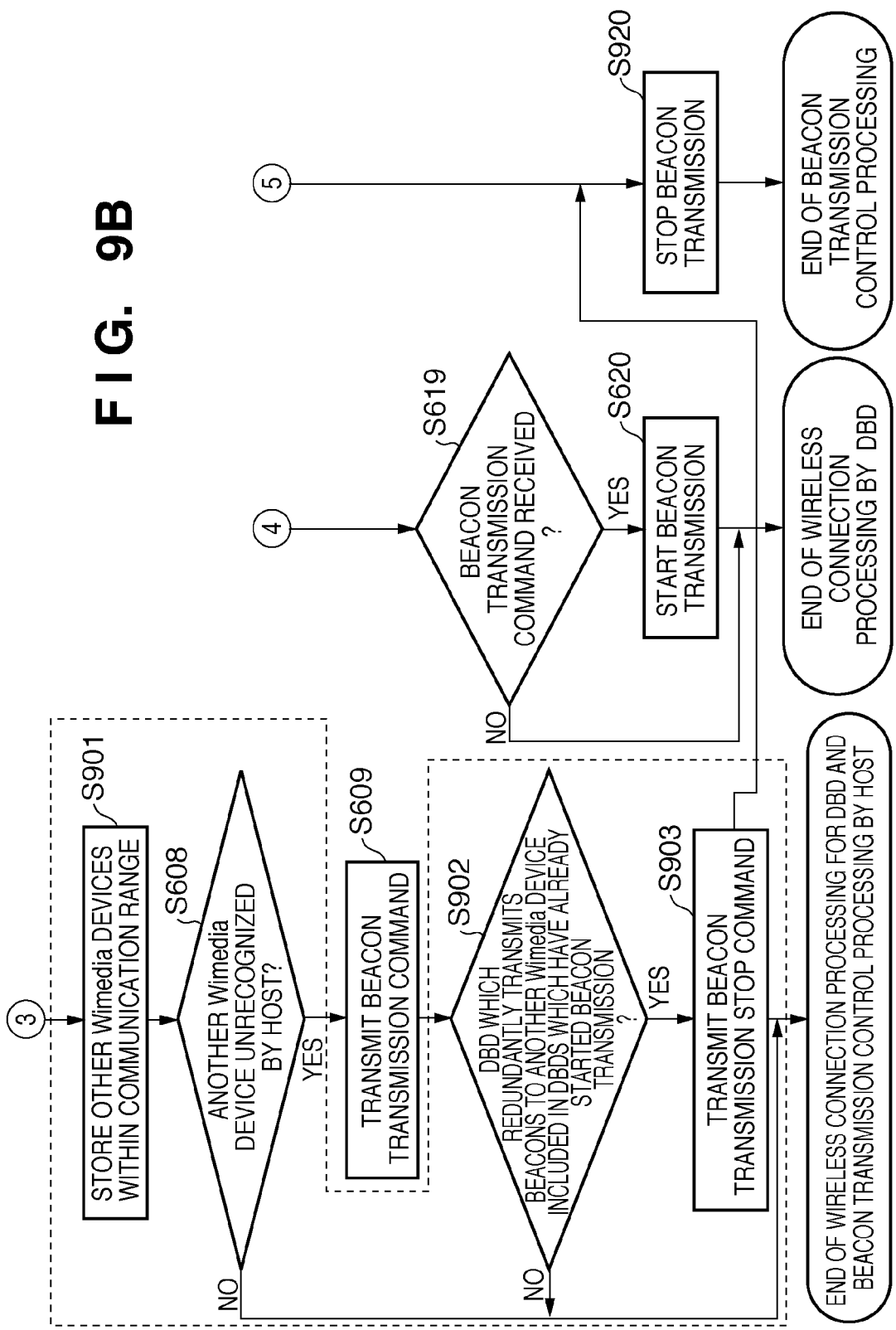

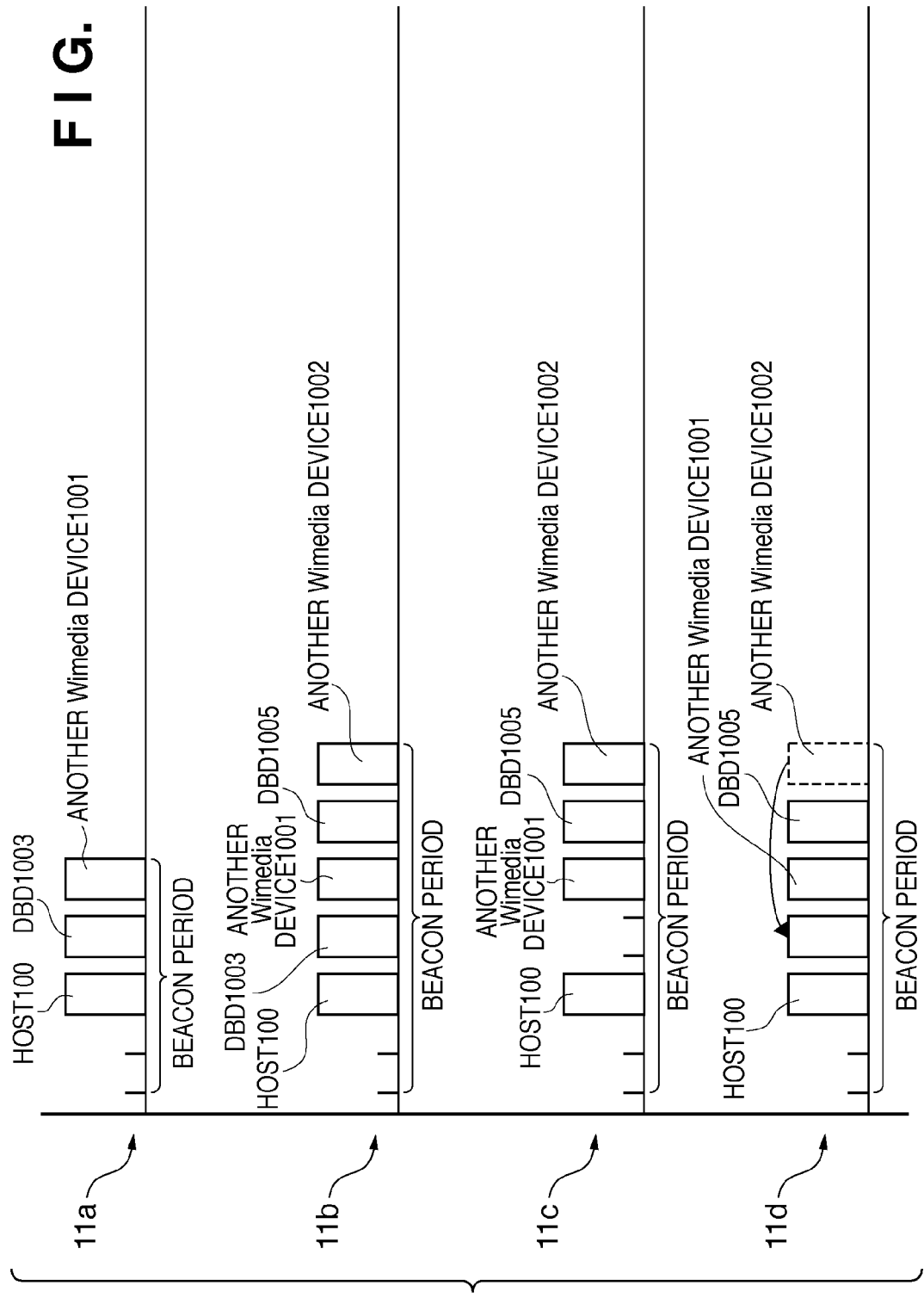

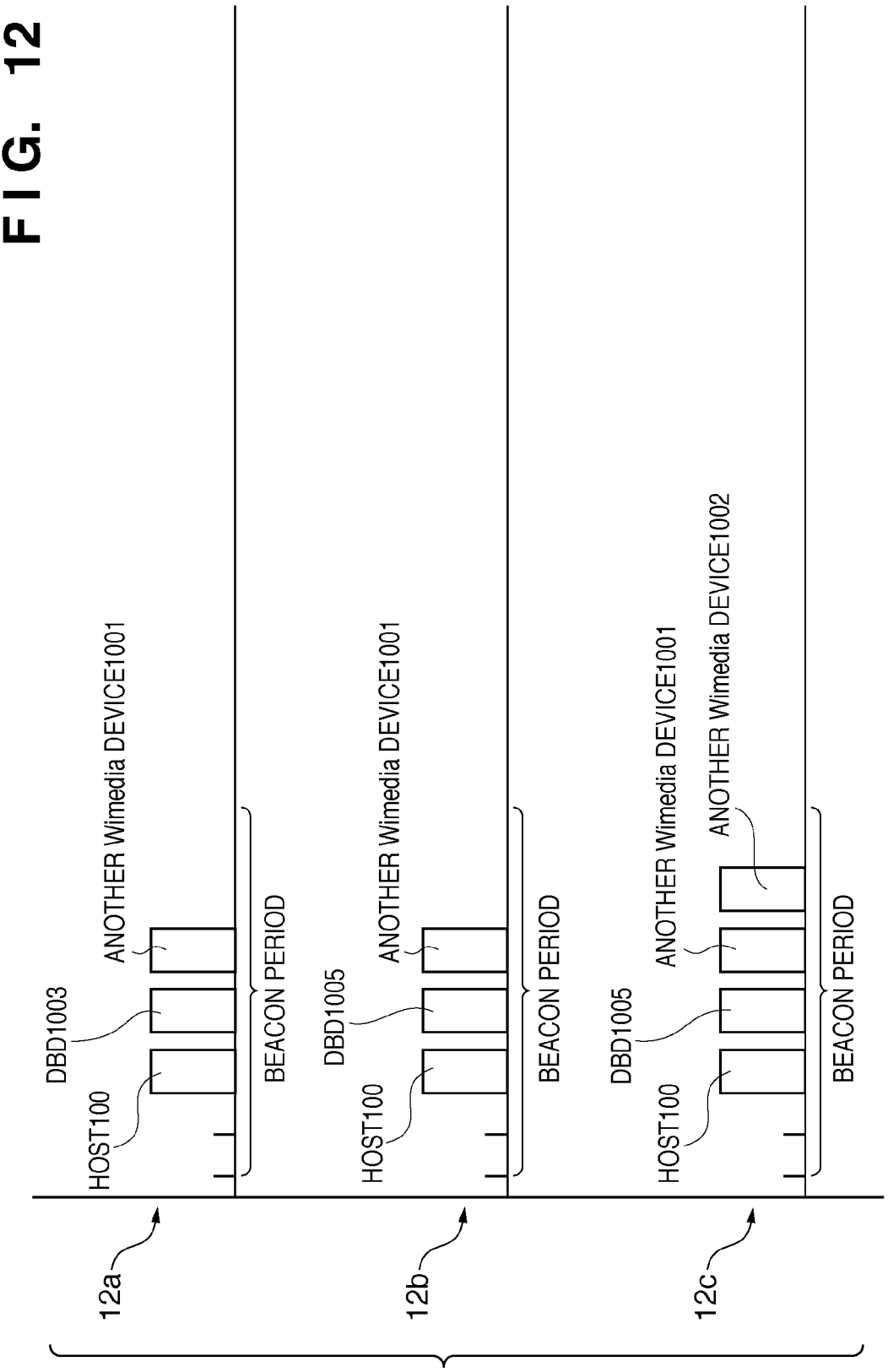

CONTROL DEVICE AND COMMUNICATION CONTROL METHOD

BACKGROUND OF THE INVENTION

1. Field of the Invention

The present invention relates to a communication control technique for communication between a control device and a controlled device.

2. Description of the Related Art

Wireless communication via a wireless USB using UWB (Ultra Wide Band) has recently received a great deal of attention (e.g., Wireless Ultra Serial Bus Specification 1.0).

A wireless USB can operate on the autonomous distributed Wimedia protocol and also implement centralized wireless communication using a host as a control station.

In such a wireless USB, a "device" (controlled device) is defined as a device which wirelessly communicates with a host (control device). Examples of the device are devices ("Wimedia devices") which comply with the Wimedia protocol, and devices ("non-Wimedia devices") which do not comply with the Wimedia protocol. The former include a self beaconing device (SBD). The latter include a directed beaconing device (DBD).

An SBD can autonomously transmit/receive a beacon complying with the Wimedia protocol. On the other hand, a DBD can transmit a beacon complying with the Wimedia protocol not autonomously but in accordance with an instruction from the host.

In the wireless USB, the devices synchronize based on a MMC (Micro-scheduled Management Command) transmitted from the host to coexist with each other.

Alternatively, a device synchronizes with the host based on a beacon transmitted from another device (e.g., SBD or DBD) synchronized with the host. For example, a Wimedia device located outside the wireless communication range of the host synchronizes with the host via a predetermined device located within that range. Such a device will be referred to as "another Wimedia device" hereinafter.

Another Wimedia device autonomously starts beacon transmission simultaneously with activation. However, the device exists outside the wireless communication range of the host and is never recognized by it directly. The device can be recognized by the host via a predetermined device (e.g., SBD or DBD) within the wireless communication range of the host and synchronize with the host based on a beacon transmitted from the predetermined device.

More specifically, the devices included in the wireless communication network synchronize with each other in the following way.

A device (e.g., host, Wimedia device (SBD), or another Wimedia device) complying with the Wimedia protocol synchronizes with the host using continuously transmitted/received beacons.

On the other hand, a non-Wimedia device (DBD) can neither autonomously transmit a beacon nor understand a received beacon, as described above. The device directly detects an MMC (Micro-scheduled Management Command) transmitted by the host, thereby ensuring synchronization of a device complying with the Wimedia protocol.

Of the devices complying with the Wimedia protocol, another Wimedia device is located outside the wireless communication range of the host, as described above, and cannot directly receive a beacon transmitted from the host. For this reason, the other Wimedia device recognizes, via a beaconing device (SBD or DBD) within the wireless communication range of the host, the contents of a beacon transmitted from the host, and synchronizes with the host.

If another Wimedia device recognizes the contents of a beacon via an SBD, it can synchronize with the host by receiving beacons continuously transmitted from the SBD.

However, a DBD does not autonomously transmit a beacon. Hence, to synchronize another Wimedia device via a DBD, the host must instruct the DBD to start beacon transmission.

More specifically, the host transmits a beacon transmission command to the DBD, thereby giving the instruction to start beacon transmission.

However, the wireless USB does not define an arrangement for determining based on the state of the wireless communication network whether to cause the DBD to transmit a beacon. That is, setting conditions to cause the DBD to start beacon transmission is left to the designer of the wireless communication network.

For this reason, the DBD may unnecessarily transmit a beacon depending on the state (device configuration or the wireless communication state of each device) in the wireless communication network.

For example, if another Wimedia device synchronizes with the host because a device has already started beacon transmission before a specific DBD starts beacon transmission, beacon transmission by the DBD may be redundant. In this case, the redundant beacon transmission for the other Wimedia device is unnecessary beacon transmission.

If such a DBD which unnecessarily transmits a beacon is included in the wireless communication network, the DBD wastes its power. Additionally, if the number of devices which transmit beacons increases, the beacon period is prolonged proportionally. Hence, a device which receives a beacon also wastes its power.

SUMMARY OF THE INVENTION

The present invention has been made in consideration of the above-described problems.

A control device according to the present invention has the following arrangement. More specifically, a control device which communicates with a controlled device, comprises: a first instruction unit configured to instruct the controlled device to transmit a signal captured by the controlled device to the control device; a reception unit configured to receive the captured signal transmitted from the controlled device in accordance with the instruction of the first instruction unit; a decision unit configured to decide, based on the captured signal the reception unit have received from each of a plurality of controlled devices, a controlled device which should transmit a beacon; and a second instruction unit configured to instruct the controlled device decided by the decision unit to transmit a beacon.

A communication control method according to the present invention has the following arrangement. More specifically, a communication control method in a control device which communicates with a controlled device, comprises the steps of: instructing the controlled device to transmit a signal captured by the controlled device to the control device; receiving the captured signal transmitted from the controlled device in accordance with the instruction in the instructing step of instructing the controlled device to transmit the signal to the control device; deciding, based on the captured signal received from each of a plurality of controlled devices in the receiving step, a controlled device which should transmit a beacon; and instructing the controlled device decided in the deciding step to transmit a beacon.

It is possible to reduce unnecessary beacon transmission by a controlled device.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing the overall arrangement of a wireless frame;

FIG. 3 is a view showing the arrangement of a beacon period included in a wireless frame;

FIGS. 9A and 9B are flowcharts illustrating the sequence of wireless connection processing for a DBD and beacon transmission control processing by the host 100, and beacon transmission control processing by the corresponding DBD;

FIG. 11 is a view showing the transition of a beacon slot occupied state; and

FIG. 12 is a view showing the transition of a beacon slot occupied state.

DESCRIPTION OF THE EMBODIMENTS

Preferred embodiments of the present invention will now be described in detail in accordance with the accompanying drawings.

[First Embodiment]
<1. ARRANGEMENT OF HOST>

Figure 1:
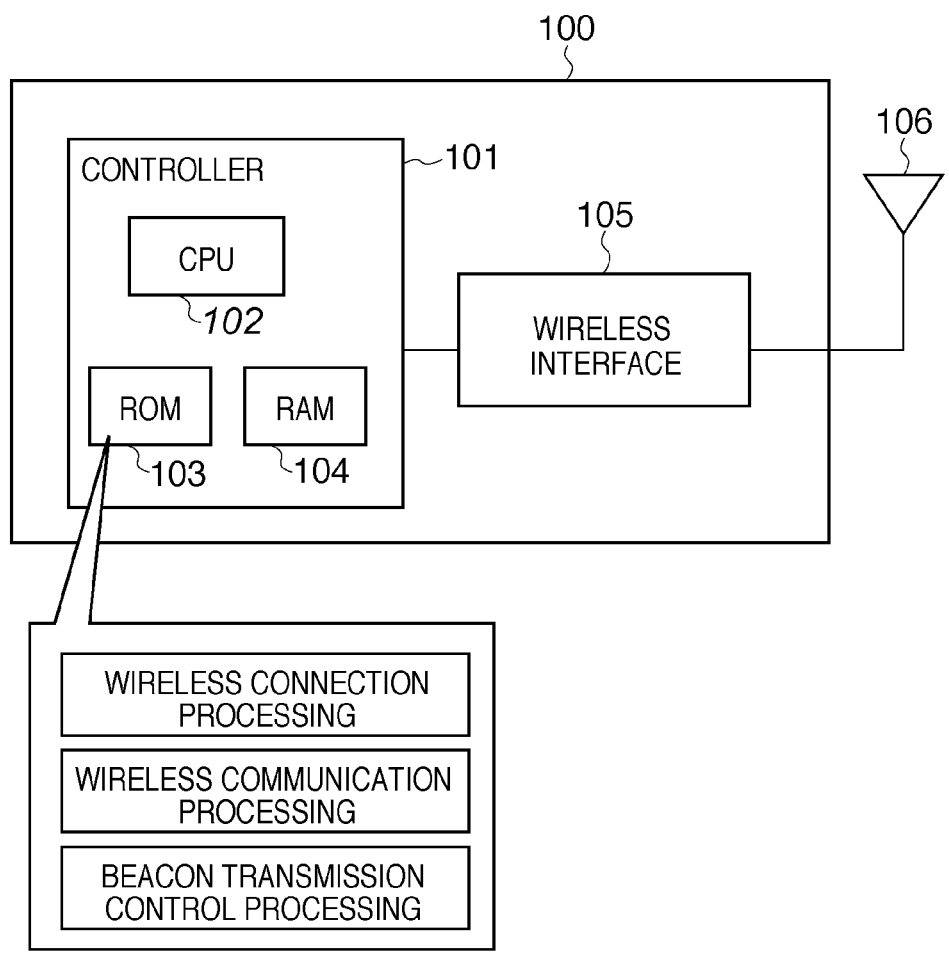
FIG. 1 is a block diagram showing the arrangement of a host 100 according to the first embodiment of the present invention.

FIG. 1 is a block diagram showing the arrangement of a host 100 according to the first embodiment of the present invention.

Referring to FIG. 1, a controller 101 implements a communication control function to be described below. The controller 101 includes a CPU 102 and executes a control program associated with wireless communication, which is stored in a ROM 103, thereby implementing the communication control function.

The communication control function to be implemented includes a wireless connection processing function of wirelessly connecting a device upon activating the device, and a wireless communication processing function of wirelessly communicating with the device after wireless connection.

The communication control function also includes a beacon transmission control processing function of controlling beacon transmission by a DBD during wireless communication.

The beacon transmission control processing function includes processing of transmitting a command (count packet command) to a DBD to make it monitor a signal transmitted from each device. The function also includes processing of transmitting a command (capture packet command) to the DBD to make it capture (acquire) all received signals. The function also includes processing of analyzing the captured signal transmitted from the DBD in response to the capture packet command. Additionally, the function includes processing of determining based on the analysis result whether another Wimedia device unrecognized by the host 100 exists, and transmitting a beacon transmission command to the DBD, as needed, to instruct it to start beacon transmission.

A RAM 104 provides a work area to be used by the CPU 102 for execution of the control program. A wireless interface 105 transmits, via an antenna 106, a transmission signal output from the controller 101, or converts a signal received via the antenna 106 into a digital signal processable by the controller 101.

Each of devices (SBDs and DBDs) included in the wireless communication network, except the host 100, basically has the same arrangement as the host 100, and a description thereof will be omitted.

The communication control function of an SBD or DBD includes at least a wireless connection processing function of wirelessly connecting the host 100, and a wireless communication function of wirelessly communicating with the host 100. The communication control function of a DBD also includes a beacon transmission control function of controlling beacon transmission based on a command from the host 100.

<2. HOW TO SYNCHRONIZE DEVICES COMPLYING WITH WIMEDIA PROTOCOL AND HOW TO SHARE COMMUNICATION REGION>

How to synchronize devices (host and SBDs) complying with the Wimedia protocol in the wireless communication network and how to share a communication region will be described with reference to the arrangement of a wireless frame to be used by the devices.

(1) Overall Arrangement of Wireless Frame

FIG. 2 is a view showing the overall arrangement of a wireless frame. The devices included in the wireless communication network synchronize based on a super frame which has a fixed time length and is repeatedly generated.

The super frame has a time length of about 65 msec and is divided into 256 time slots at regular intervals. The use right of each data communication time slot to be used for data communication out of these time slots is arbitrated by causing the devices complying with the Wimedia protocol to exchange beacons with each other.

One or more time slots corresponding to the start portion of the super frame are ensured as a region to cause devices to transmit beacons. This region is called a beacon period.

(2) Arrangement of Beacon Period Included in Wireless Frame

FIG. 3 is a view showing the arrangement of the beacon period included in the wireless frame. The beacon period includes a plurality of beacon slots each having a length of about 85 μsec. The beacon period has a variable length depending on the number of devices included in the wireless communication network.

The start point of the beacon period is called BPST (Beacon Period Start Time). In other words, the BPST is the start point of the super frame.

A plurality of devices (devices complying with the Wimedia protocol) included in one wireless communication network shares BPST corresponding to the start point of a super frame. Hence, a beacon transmitted by each device has the following arrangement.

(3) Arrangement of Beacon

Figure 4:
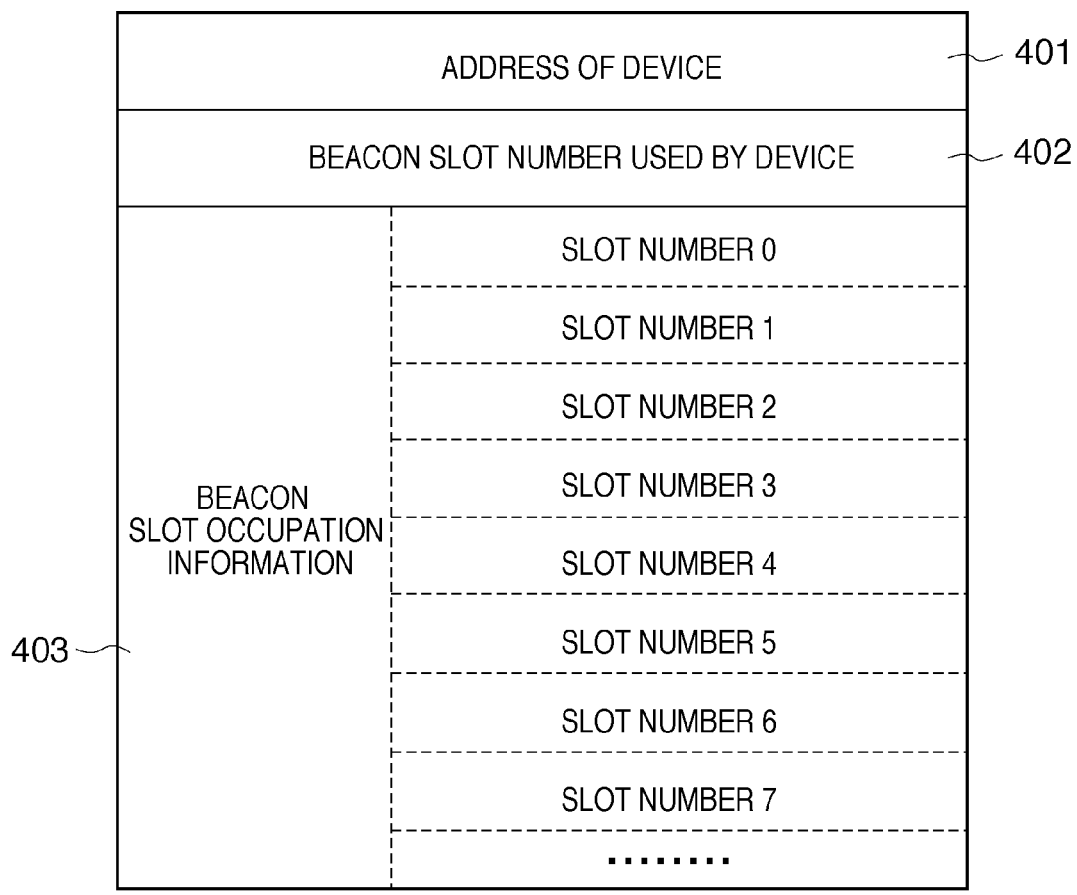
FIG. 4 is a schematic view showing the arrangement of a beacon.

FIG. 4 is a schematic view showing the arrangement of a beacon. As shown in FIG. 4, each device includes, in its beacon, an address 401 of the device and a beacon slot number 402 used by the device for beacon transmission.

Upon receiving a beacon, a device complying with the Wimedia protocol analyzes the contents of the beacon. Based on the actual beacon reception time and the beacon slot number 402 included in the beacon, the device calculates the BPST recognized by the device which has transmitted the beacon.

In this way, the devices complying with the Wimedia protocol determine the BPST recognized by another device and defines the BPST as the start reference point of a super frame, thereby synchronizing with each other.

Each device complying with the Wimedia protocol also includes, in its beacon, beacon slot occupation information 403 which stores the address of another recognized device in correspondence with a beacon slot number.

Although not illustrated in FIG. 4, the beacon also contains, as DRP (Distributed Reservation Protocol) reservation information, a type representing a reservation such as a private reservation or a device designation reservation. Information about a partner device as a reservation target and information about a reserved data communication slot are also included.

The host 100 reserves a private DRP using these pieces of information included in a beacon.

An SBD reserves the same communication region as that of the host 100 as a private DRP using a beacon.

(4) Arrangement of Data Communication Time Slot

A data communication time slot includes a slot reserved as a DRP by the host 100 using a beacon on the Wimedia protocol.

The slot reserved as the DRP by the host 100 includes an MMC (Micro-scheduled Management Command) and data.

Figure 5:
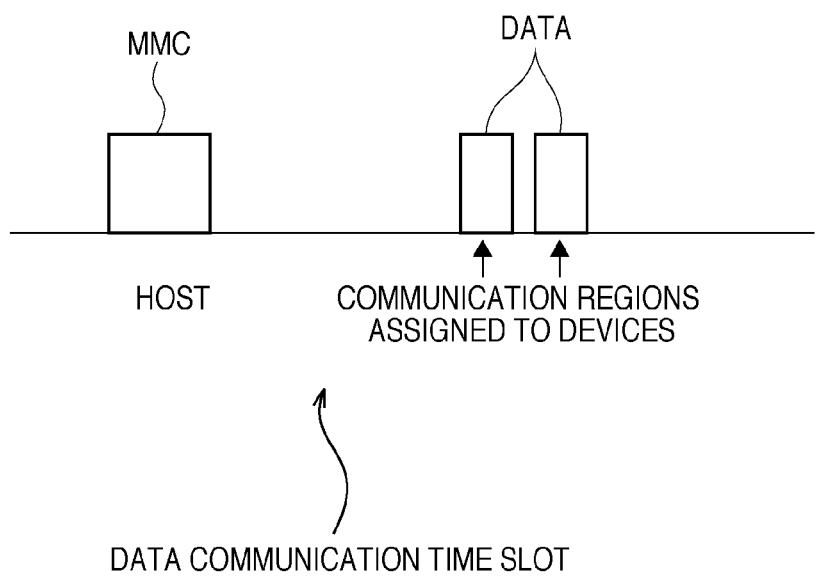
FIG. 5 is a schematic view showing the arrangement of a data communication time slot.

FIG. 5 is a schematic view showing the arrangement of a slot reserved by the host 100 as a DRP in a data communication time slot. As shown in FIG. 5, devices which synchronize with each other and form a wireless communication network share a single slot. In the single slot, communication regions for data communication are assigned to the devices.

Referring to FIG. 5, an MMC (Micro-scheduled Management Command) is transmitted by the host 100. The devices other than the host 100 perform data communication in regions. The regions are assigned in accordance with the MMC.

<3. How to Synchronize Non-Wimedia Devices and How to Share Communication Region>

A DBD which is a non-Wimedia device cannot recognize a received beacon complying with the Wimedia protocol. The DBD directly detects MMCs and recognizes a communication region for data communication, thereby communicating with the host 100. The DBD performs communication in accordance with the MMCs in a private DRP reserved by the host 100. Hence, the DBD can communicate in synchronism with a Wimedia terminal recognized by the host 100.

<4. Explanation of Operations of Devices which Wirelessly Communicate with Host 100>

The operations of an SBD and a DBD which wirelessly communicate with the host 100 (the operations of an SBD and a DBD until the host 100 recognizes another Wimedia device, and the other Wimedia device synchronizes with the host 100) will be described next.

<4.1 Explanation of Operation of SBD>

An SBD which is a Wimedia device autonomously transmits a beacon complying with the Wimedia protocol. That is, the SBD transmits a beacon which has a beacon period defined by the Wimedia protocol and stores the address of the SBD itself in a predetermined beacon slot of the same beacon period as that of the host.

Upon receiving a beacon transmitted from another Wimedia device, the SBD determines the contents of the received beacon. The SBD exchanges beacons with the other Wimedia device, thereby sharing the beacon period with the other Wimedia device (the addresses of the devices are stored in different beacon slots).

The SBD also transmits, to the host 100, a beacon whose beacon period is shared by the other Wimedia device. The host 100 reserves the beacon period of the other Wimedia device. From then on, the address of the other Wimedia device is stored in the beacon slot of a beacon transmitted from the host 100 so that the other Wimedia device synchronizes with the host 100.

<4.2 Explanation of Operation of DBD>

On the other hand, a DBD which is a non-Wimedia device cannot understand a beacon transmitted from another Wimedia device. Additionally, the DBD does not autonomously transmit a beacon unless the host 100 transmits a beacon transmission command.

For this reason, even when a DBD is located within a range where a beacon transmitted from another Wimedia device is receivable, the host 100 cannot recognize the existence of the other Wimedia device.

To recognize the other Wimedia device via the DBD, the host 100 transmits a count packet command and a capture packet command to the DBD.

Upon receiving the count packet command from the host 100, the DBD detects the timings and IDs of all communications in a predetermined period and transmits the detection result to the host 100. The host 100 can recognize based on the detection result whether a device exists within the wireless communication range of the DBD.

Upon recognizing that a device exists within the wireless communication range of the DBD, the host 100 transmits a capture packet command to the DBD. Upon receiving the capture packet command from the host 100, the DBD captures a signal transmitted from the device within the wireless communication range, and transmits the captured signal to the host 100.

The host 100 analyzes the captured signal and recognizes that another Wimedia device which is not recognized by the host exists within the wireless communication range of the DBD.

After recognizing the other unrecognized Wimedia device, the host 100 transmits a beacon transmission command to the DBD as needed (in accordance with beacon transmission control processing to be described later). Then, the DBD starts beacon transmission.

The other Wimedia device synchronizes with the host 100 by receiving a beacon transmitted from the DBD synchronized with the host 100.

<5. Explanation of Host 100>

Wireless connection processing for a DBD and beacon transmission control processing by the host 100 according to this embodiment will be described next.

Figure 6A:
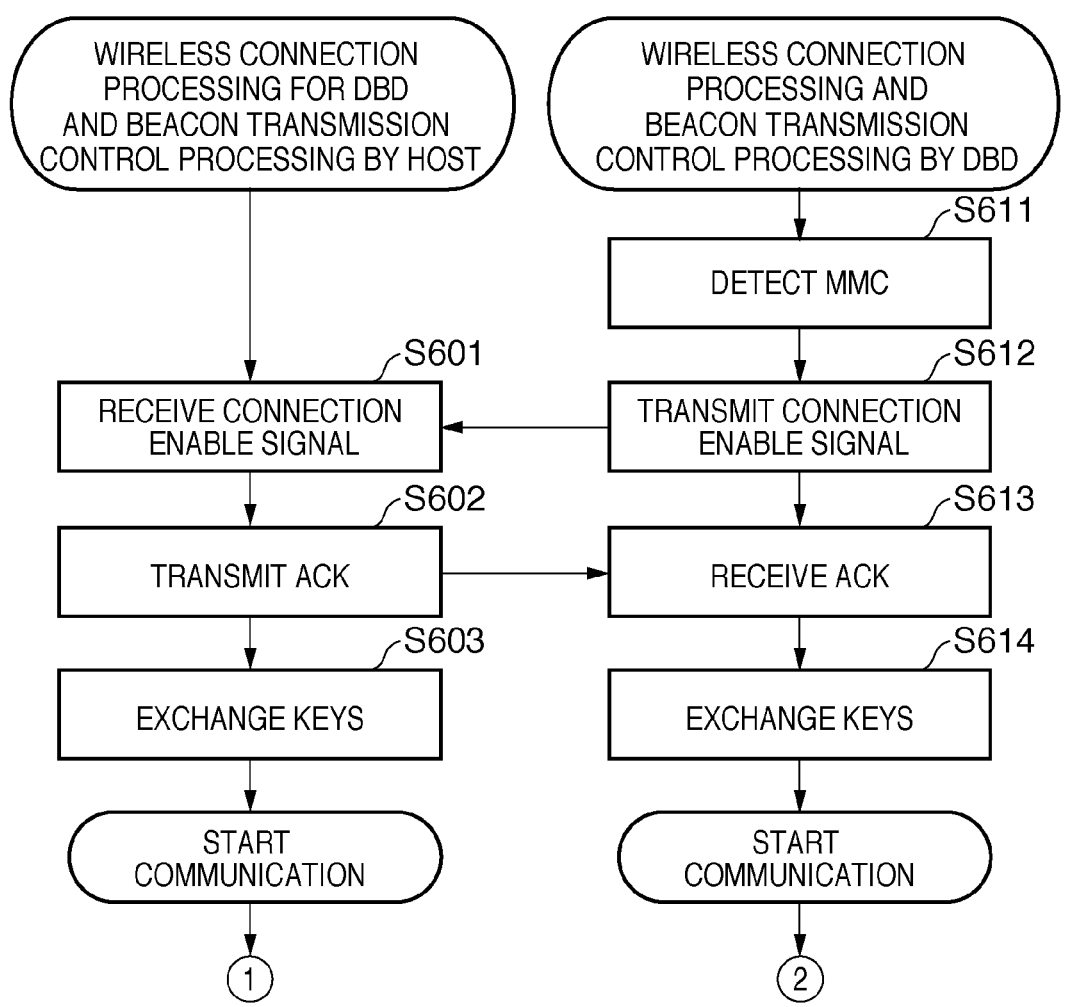
FIGS. 6A and 6B are flowcharts illustrating the sequence of wireless connection processing for a DBD and beacon transmission control processing by the host, and wireless connection processing for the host and beacon transmission control processing by the corresponding DBD.
Figure 6B:
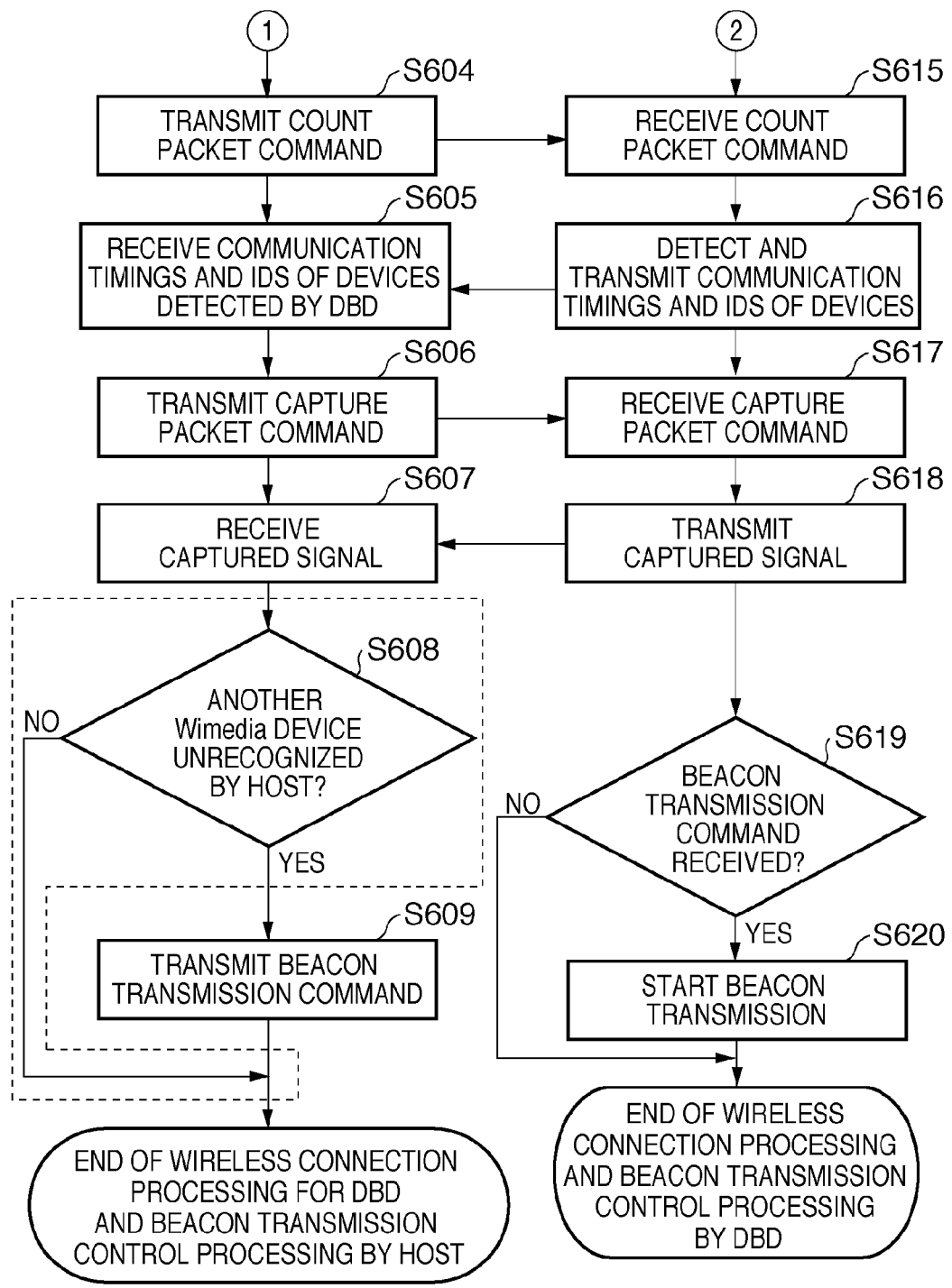

FIGS. 6A and 6B are flowcharts illustrating the sequence of wireless connection processing for a DBD and beacon transmission control processing by the host, and wireless connection processing for the host and beacon transmission control processing by the corresponding DBD.

Before execution of this processing, the host 100 starts beacon transmission in accordance with the Wimedia protocol.

In step S611, the DBD receives an MMC. In step S612, the DBD acquires a time set in the received MMC, at which a new device connection enable signal is to be received, and transmits a connection enable signal to the host 100 at the acquired time.

In step S601, the host 100 receives the connection enable signal transmitted from the DBD. In step S602, the host 100 transmits an ACK signal to the DBD.

In step S613, the DBD receives the ACK signal transmitted from the host 100 and advances to step S614 (the host 100 transmits the ACK signal in step S602 and then advances to step S603).

In step S614 or S603, the host 100 and the DBD exchange keys. The wireless connection processing is thus completed. This enables wireless communication between the host 100 and the DBD, and beacon transmission control processing starts.

When beacon transmission control processing starts, the host 100 transmits a count packet command to the DBD in step S604.

In step S615, the DBD receives the count packet command transmitted from the host 100. In step S616, the DBD detects the timings of all communications received in a predetermined period and the IDs of devices which perform the communications, and transmits the detection result to the host 100.

In step S605, the host 100 receives the detection result and determines based on it whether a device exists within the wireless communication range of the DBD.

Upon determining that a device exists, the host 100 transmits a capture packet command to the DBD in step S606 (first instruction unit).

In step S617, the DBD receives the capture packet command from the host 100. In step S618, the DBD captures a signal transmitted from the device within the wireless communication range, and transmits the captured signal to the host 100.

In step S607, the host 100 receives the captured signal transmitted from the DBD, and analyzes its contents. In step S608, the host 100 determines based on the captured signal analysis result whether there is another Wimedia device which is not recognized by the host 100 at that point of time (first determination unit).

If the host 100 determines in step S608 that another Wimedia device exists, the process advances to step S609 to transmit a beacon transmission command to the DBD (second instruction unit).

If the host 100 determines in step S608 that no other Wimedia device exists, the beacon transmission control processing is ended without transmitting a beacon transmission command.

In step S619, the DBD determines whether a beacon transmission command is received from the host 100. If the DBD determines that a beacon transmission command is received, the process advances to step S620 to start beacon transmission.

If the DBD determines in step S619 that no beacon transmission command is received from the host 100, the beacon transmission control processing is ended without starting beacon transmission.

As described above, when a DBD is activated, the host 100 according to this embodiment determines the presence/absence of another Wimedia device unrecognized by the host itself. If no other Wimedia device exists, control is performed not to transmit a beacon transmission command to the DBD (dotted line portion).

This makes it possible to prevent a newly wirelessly connected DBD from redundantly transmitting a beacon to another Wimedia device to synchronize it with the host although the other Wimedia device already synchronizes with the host.

<6. First Example>

Detailed examples of the wireless connection processing for a DBD and the beacon transmission control processing by the host 100 according to this embodiment will be described with reference to FIG. 7.

Figure 7:
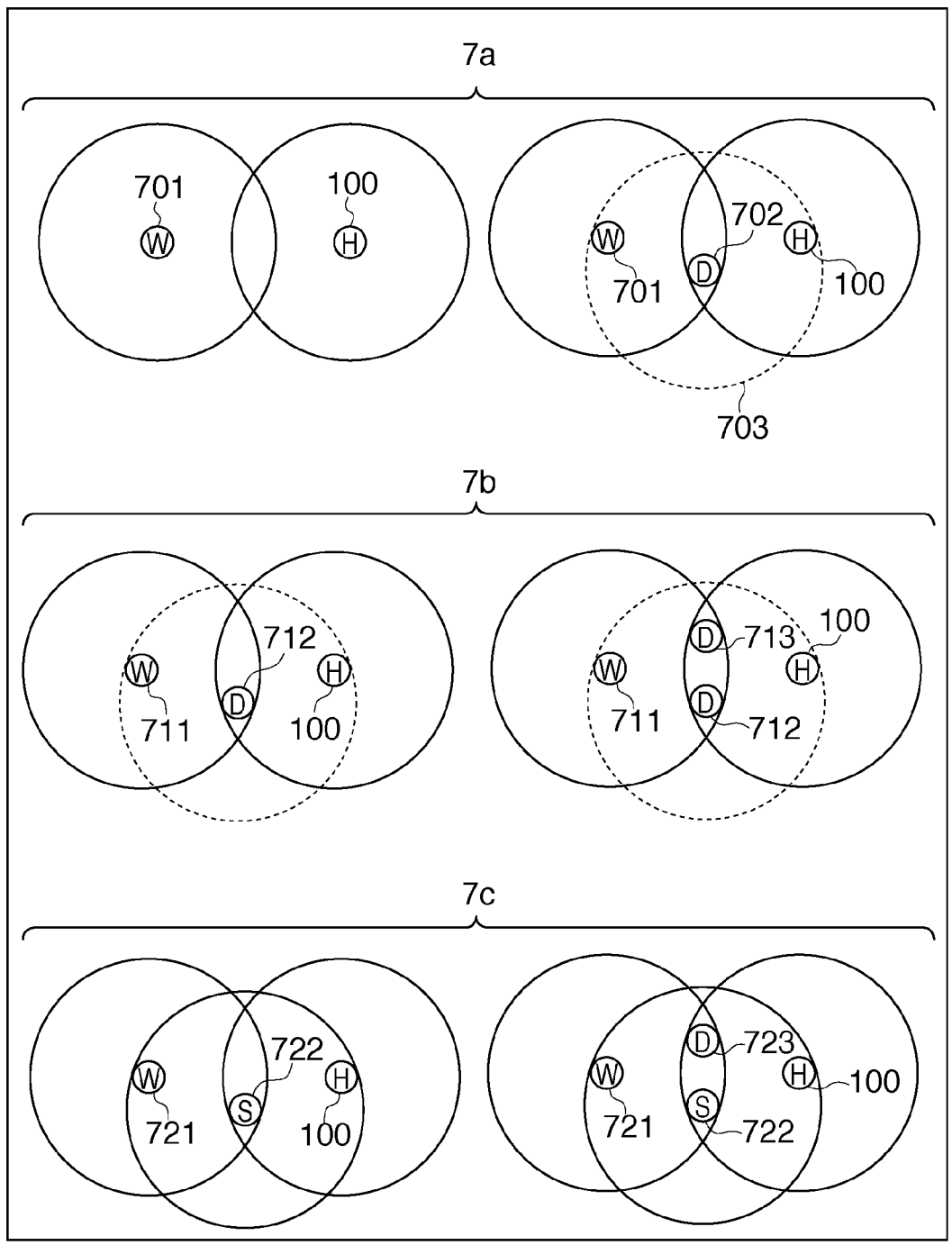
FIG. 7 is a view for explaining detailed examples of the wireless connection processing for a DBD and the beacon transmission control processing by the host 100.

In each of 7*a* to 7*c* of FIG. 7, the state of the wireless communication network before the host 100 executes the wireless connection processing for a DBD and the beacon transmission control processing is shown on the left side. The state of the wireless communication network after the host 100 has executed the wireless connection processing for a DBD and the beacon transmission control processing is shown on the right side.

Referring to FIG. 7, "H" represents the host; "W", another Wimedia device; "D", a DBD; and "S", an SBD. Each solid line in FIG. 7 indicates that a device complying with the Wimedia protocol is performing beacon transmission. A range indicated by a solid line represents the wireless communication range of a device. Each dotted line in FIG. 7 indicates that a DBD is performing beacon transmission. A range indicated by a dotted line represents the wireless communication range of a DBD.

The left side of 7*a* of FIG. 7 illustrates a state in which another Wimedia device 701 is located outside the wireless communication range of the host 100. Assume that a DBD 702 which is located within the wireless communication ranges of both the other Wimedia device 701 and the host 100 is activated in this state.

In this case, the host 100 recognizes the other Wimedia device 701 only upon receiving a captured signal transmitted from the DBD 702. Hence, in step S608, the host 100 determines that there is another Wimedia device which is not recognized by the host 100 at that point of time.

As a result, the host 100 transmits a beacon transmission command to the DBD 702 (step S609). The DBD 702 starts beacon transmission, as indicated by 703.

The left side of 7*b* of FIG. 7 illustrates a state in which another Wimedia device 711 is located outside the wireless communication range of the host 100, and a DBD 712 which is located within the wireless communication ranges of both the other Wimedia device 711 and the host 100 is already activated and is performing beacon transmission. Assume that a DBD 713 which is located within the wireless communication ranges of both the other Wimedia device 711 and the host 100 is activated in this state.

In this case, the host 100 recognizes the other Wimedia device 711 again upon receiving a captured signal transmitted from the DBD 713. However, the other Wimedia device 711 has already been recognized by the host 100 via the DBD 712 when the DBD 713 is activated. Hence, in step S608, the host 100 determines that there is no other Wimedia device which is not recognized by the host 100 at that point of time.

As a result, the host 100 transmits no beacon transmission command to the DBD 713. The DBD 713 does not start beacon transmission.

The left side of 7c of FIG. 7 illustrates a state in which another Wimedia device 721 is located outside the wireless communication range of the host 100, and an SBD 722 which is located within the wireless communication ranges of both the other Wimedia device 721 and the host 100 is already activated and is performing beacon transmission. Assume that a DBD 723 which is located within the wireless communication ranges of both the other Wimedia device 721 and the host 100 is activated in this state.

In this case, the host 100 recognizes the other Wimedia device 721 again upon receiving a captured signal transmitted from the DBD 723. However, the other Wimedia device 721 has already been recognized by the host 100 based on a beacon transmitted from the SBD 722. Hence, in step S608, the host 100 determines that there is no other Wimedia device which is not recognized by the host 100 at that point of time.

As a result, the host 100 transmits no beacon transmission command to the DBD 723. The DBD 723 does not start beacon transmission.

<7. Second Example>

In the above-described first example, only one other Wimedia device exists. However, the wireless connection processing for a DBD and the beacon transmission control processing by the host 100 according to this embodiment are also applicable even when a plurality of other Wimedia devices exists.

Detailed examples of the wireless connection processing for a DBD and the beacon transmission control processing by the host 100 according to this embodiment when a plurality of other Wimedia devices exists will be described below with reference to FIG. 8.

Figure 8:
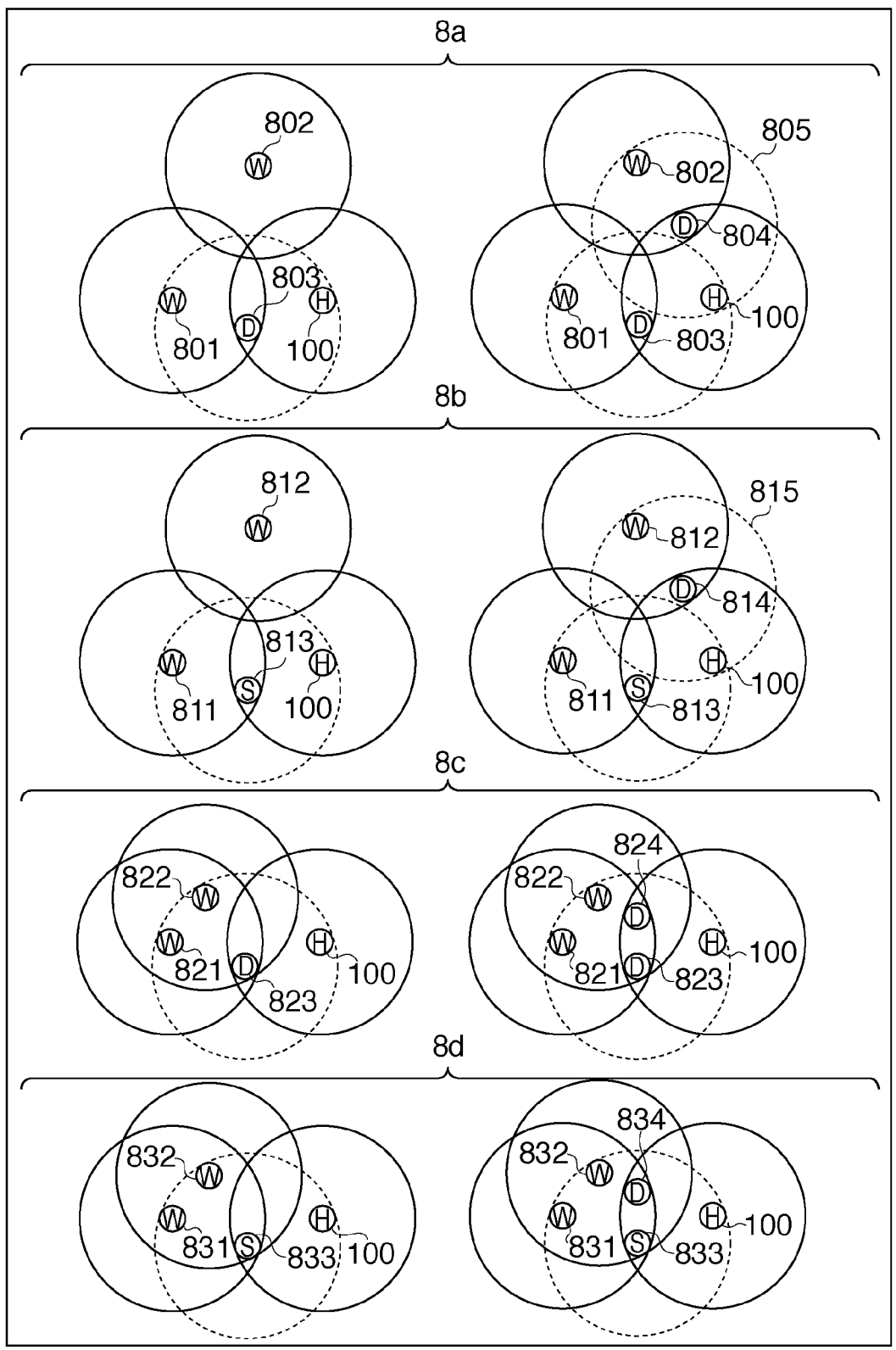
FIG. 8 is a view for explaining detailed examples of the wireless connection processing for a DBD and the beacon transmission control processing by the host 100.

The left side of 8a of FIG. 8 illustrates a state in which other Wimedia devices 801 and 802 are located outside the wireless communication range of the host 100, and a DBD 803 which is located within the wireless communication ranges of both the other Wimedia device 801 and the host 100 is performing beacon transmission. Assume that a DBD 804 which is located within the wireless communication ranges of both the other Wimedia device 802 and the host 100 is activated in this state.

In this case, the host 100 recognizes the other Wimedia device 802 only upon receiving a captured signal transmitted from the DBD 804. Hence, in step S608, the host 100 determines that there is another Wimedia device which is not recognized by the host 100 at that point of time.

As a result, the host 100 transmits a beacon transmission command to the DBD 804. Upon receiving this command, the DBD 804 starts beacon transmission, as indicated by 805.

The left side of 8b of FIG. 8 illustrates a state in which other Wimedia devices 811 and 812 are located outside the wireless communication range of the host 100, and an SBD 813 which is located within the wireless communication ranges of both the other Wimedia device 811 and the host 100 is performing beacon transmission. Assume that a DBD 814 which is located within the wireless communication ranges of both the other Wimedia device 812 and the host 100 is activated in this state.

In this case, the host 100 recognizes the other Wimedia device 812 only upon receiving a captured signal transmitted from the DBD 814. Hence, in step S608, the host 100 determines that there is another Wimedia device which is not recognized by the host 100 at that point of time.

As a result, the host 100 transmits a beacon transmission command to the DBD 814. Upon receiving this command, the DBD 814 starts beacon transmission, as indicated by 815.

The left side of 8c of FIG. 8 illustrates a state in which two other Wimedia devices 821 and 822 are located outside the wireless communication range of the host 100, and a DBD 823 is performing beacon transmission. Note that the DBD 823 is located within the wireless communication ranges of all the other Wimedia devices 821 and 822 and the host 100. Assume that a DBD 824 which is located within the wireless communication ranges of all the other Wimedia devices 821 and 822 and the host 100 is activated in this state.

In this case, the host 100 recognizes the other Wimedia devices 821 and 822 again upon receiving a captured signal transmitted from the DBD 824. However, the other Wimedia devices 821 and 822 have already been recognized by the host 100 via the DBD 823 when the DBD 824 is activated. Hence, in step S608, the host 100 determines that there is no other Wimedia device which is not recognized by the host 100 at that point of time.

As a result, the host 100 transmits no beacon transmission command to the DBD 824. The DBD 824 does not start beacon transmission.

The left side of 8d of FIG. 8 illustrates a state in which two other Wimedia devices 831 and 832 are located outside the wireless communication range of the host 100, and an SBD 833 is performing beacon transmission. Note that the SBD 833 is located within the wireless communication ranges of all the other Wimedia devices 831 and 832 and the host 100. Assume that a DBD 834 which is located within the wireless communication ranges of all the other Wimedia devices 831 and 832 and the host 100 is activated in this state.

In this case, the host 100 recognizes the other Wimedia devices 831 and 832 again upon receiving a captured signal transmitted from the DBD 834. However, the other Wimedia devices 831 and 832 have already been recognized by the host 100 based on a beacon transmitted from the SBD 833. Hence, in step S608, the host 100 determines that there is no other Wimedia device which is not recognized by the host 100 at that point of time.

As a result, the host 100 transmits no beacon transmission command to the DBD 834. The DBD 834 does not start beacon transmission.

As is apparent from the above description, when a DBD is activated newly, the host according to this embodiment determines, based on a captured signal transmitted from the DBD, the presence/absence of another Wimedia device unrecognized by the host.

Only when another Wimedia device unrecognized by the host exists, the host transmits a beacon transmission command to the DBD to synchronize the other Wimedia device with the host.

This allows preventing unnecessary beacon transmission by the DBD and suppress the power consumption of each device included in the wireless communication network.

[Second Embodiment]

In the first embodiment, an arrangement for controlling to inhibit a newly activated DBD from performing unnecessary beacon transmission has been described. However, the present invention is not limited to this.

For example, even for a DBD which is already performing beacon transmission in synchronism with the host, it may be determined whether the beacon transmission is not unnecessary. If the beacon transmission is unnecessary, the DBD is caused to stop it.

Conditions to stop the beacon transmission of the DBD in that case are as follows.

1) Stop Conditions 1

The newly wirelessly connected device is a DBD.

A beacon complying with another Wimedia device, which is not received by a device that is already transmitting beacons, is detected.

If not the device that is already transmitting beacons but the newly wirelessly connected device transmits beacons, all Wimedia devices recognizable by the host can synchronize with it.

2) Stop Conditions 2

The newly wirelessly connected device is an SBD.

When the SBD starts beacon transmission/reception, a DBD that is already transmitting beacons need not perform beacon transmission.

This embodiment will be described below in detail.

<1. Explanation Of Host 100>

Wireless connection processing for a DBD and beacon transmission control processing by a host 100 according to this embodiment will be described.

FIGS. 9A and 9B are flowcharts illustrating the sequence of wireless connection processing for a DBD and beacon transmission control processing by the host 100, and wireless connection processing for the host and beacon transmission control processing by the corresponding DBD.

Processes until the host is wirelessly connected to a DBD and starts wireless communication are the same as in steps S601 to S603 and steps S611 to S614 in FIG. 6A, and are not illustrated in FIG. 9A.

In the beacon transmission control processing which is performed after the start of wireless communication, processes in steps S604 to S607 and steps S615 to S618 are the same as corresponding processes in FIG. 6B, and a description thereof will not be repeated.

In step S901, the host analyzes a captured signal transmitted from a DBD and stores information about all other Wimedia devices within the wireless communication range of the DBD.

In step S608, the host 100 determines whether the other Wimedia devices within the wireless communication range of the DBD, which are stored in step S901, include another Wimedia device which is not recognized by the host at that point of time.

If the host 100 determines in step S608 that another Wimedia device unrecognized by the host exists, the process advances to step S609 to transmit a beacon transmission command to the DBD.

If the host 100 determines in step S608 that no other Wimedia device unrecognized by the host exists, the beacon transmission control processing is ended without transmitting a beacon transmission command.

In step S619, the DBD determines whether a beacon transmission command is received from the host 100. If the DBD determines that a beacon transmission command is received, the process advances to step S620 to start beacon transmission.

If the DBD determines in step S619 that no beacon transmission command is received from the host 100, the DBD does not start beacon transmission.

The host 100 which has transmitted the beacon transmission command in step S609 advances to step S902. In step S902, the host 100 determines whether any one of the DBDs which have already started beacon transmission redundantly transmits beacons to another Wimedia device as the result of transmission of the beacon transmission command in step S609 (second determination unit).

When a DBD is wirelessly connected, the host 100 of this embodiment stores other Wimedia devices within the wireless communication range of the DBD in step S901.

Hence, the determination in step S902 can be done by comparing the following stored contents.

Other Wimedia devices located within the wireless communication range of each DBD that has already transmitted beacons, which are stored when the DBD is wirelessly connected.

Other Wimedia devices located within the wireless communication range of the DBD that has been activated this time, which are stored when the DBD is wirelessly connected.

If the host 100 determines in step S902 that one of the DBDs which has already started beacon transmission redundantly transmits beacons to another Wimedia device, the process advances to step S903.

In step S903, the host 100 transmits a beacon transmission stop command to the DBD. Upon receiving the beacon transmission stop command, the DBD stops beacon transmission in step S920 (third instruction unit).

If the host 100 determines in step S902 that none of the DBDs which have already started beacon transmission redundantly transmits beacons to another Wimedia device, the beacon transmission control processing is ended. In this case, no beacon transmission stop command is transmitted.

As described above, even for a DBD which is already wirelessly connected to the host and is performing beacon transmission, the host 100 according to this embodiment determines whether the beacon transmission is not unnecessary. This enables to avoid unnecessary beacon transmission by the DBD.

<2. Example>

Detailed examples of the wireless connection processing for a DBD and the beacon transmission control processing by the host 100 according to this embodiment will be described with reference to FIG. 10.

Figure 10:
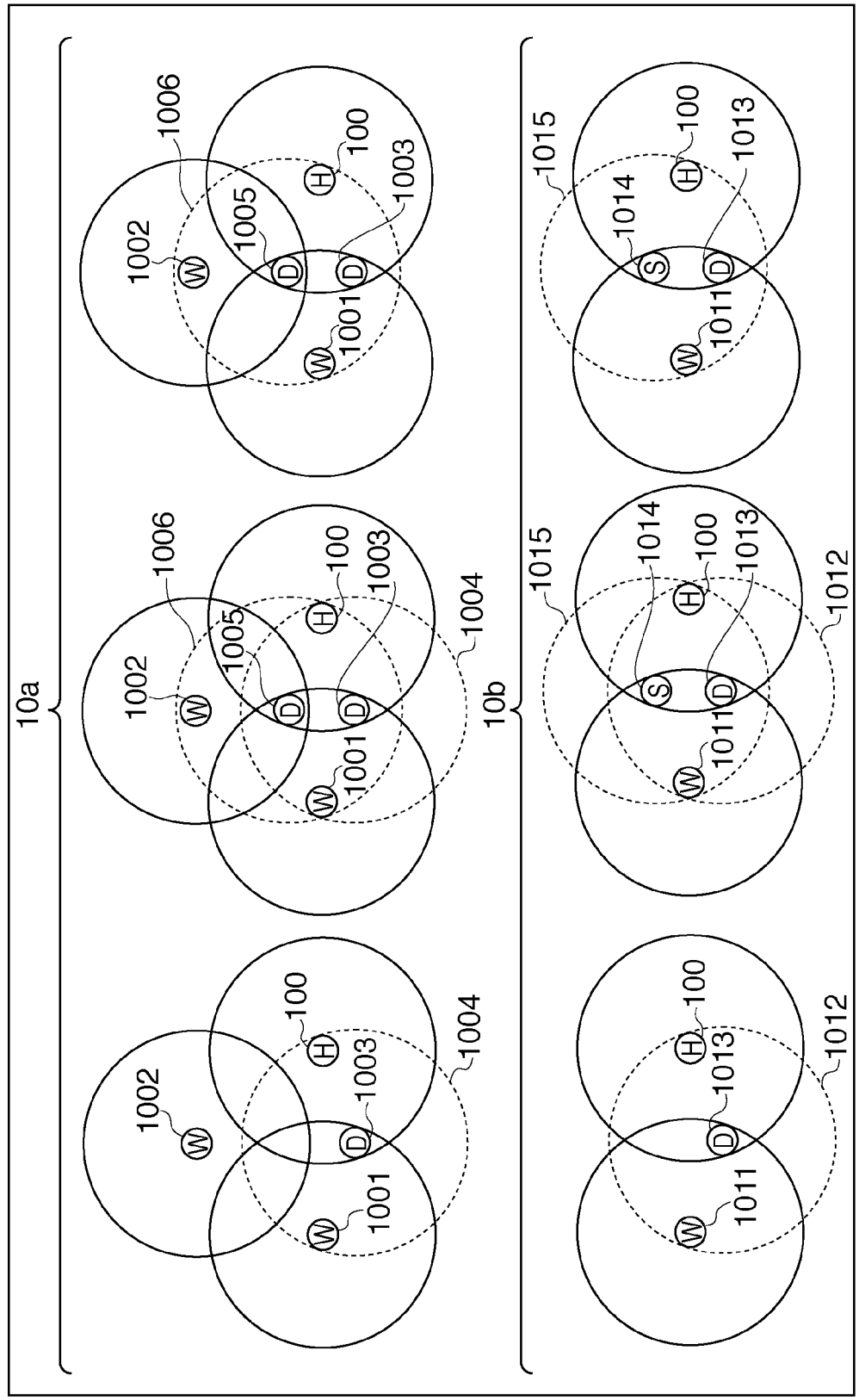
FIG. 10 is a view for explaining detailed examples of wireless connection processing for the DBD and beacon transmission control processing by the host 100.

In each of 10a and 10b of FIG. 10, the state of the wireless communication network before the host 100 executes the wireless connection processing for a DBD and the beacon transmission control processing is shown on the left side. The states of the wireless communication network after the host 100 has executed the wireless connection processing for a DBD and the beacon transmission control processing are shown at the center and on the right side.

The left side of 10a of FIG. 10 illustrates a state in which other Wimedia devices 1001 and 1002 are located outside the wireless communication range of the host 100, and a DBD 1003 (first controlled device) is located within the wireless communication ranges of the other Wimedia device 1001 and the host 100. Assume that a DBD 1005 which is located within the wireless communication ranges of all the other Wimedia devices 1001 and 1002 and the host 100 is newly activated in this state.

In this case, as described with reference to 8a of FIG. 8, the host 100 recognizes the other Wimedia device 1002 only when the DBD 1005 (second controlled device) is activated. That is, the other Wimedia device 1002 synchronizes with the host only when the DBD 1005 starts beacon transmission.

Hence, the host 100 transmits a beacon transmission command to the DBD 1005 (step S609).

The DBD 1005 is located within the wireless communication range of the other Wimedia device 1002 and also within the wireless communication range of the other Wimedia device 1001 (center of 10a of FIG. 10). For this reason, beacons transmitted from the DBD 1005 are received by the two other Wimedia devices 1001 and 1002. The two other Wimedia devices 1001 and 1002 can synchronize with the host based on the beacons transmitted from the DBD 1005.

Hence, the DBD 1003 which has already started beacon transmission before activation of the DBD 1005 redundantly transmits beacons to the other Wimedia device 1001.

As a result, the host 100 determines in step S902 that one of the DBDs which have already started beacon transmission redundantly transmits beacons to another Wimedia device.

Consequently, the host 100 transmits a beacon transmission stop command to the DBD (step S903). Upon receiving the beacon transmission stop command, the DBD stops beacon transmission (right side of 10a of FIG. 10).

The left side of 10b of FIG. 10 illustrates a state in which another Wimedia device 1011 is located outside the wireless communication range of the host 100, and a DBD 1013 is located within the wireless communication ranges of the other Wimedia device 1011 and the host 100. Assume that an SBD 1014 which is located within the wireless communication ranges of both the other Wimedia device 1011 and the host 100 is newly activated in this state.

The SBD 1014 is a device complying with the Wimedia protocol and therefore automatically starts beacon transmission upon activation.

The other Wimedia device 1011 exists within the wireless communication range of the SBD 1014 (center of 10b of FIG. 10). For this reason, beacons transmitted from the SBD 1014 are received by the other Wimedia device 1011. The other Wimedia device 1011 synchronizes with the host based on the beacons transmitted from the SBD 1014.

Hence, the DBD 1013 which has already started beacon transmission before activation of the SBD 1014 redundantly transmits beacons to the other Wimedia device 1011. As a result, the host 100 determines in step S902 that one of the DBDs which have already started beacon transmission redundantly transmits beacons to another Wimedia device.

Consequently, the host 100 transmits a beacon transmission stop command to the DBD 1013 (step S903). Upon receiving the beacon transmission stop command, the DBD 1013 stops beacon transmission (right side of 10b of FIG. 10).

As described above, if a DBD which is already wirelessly connected is unnecessarily transmitting beacons to another Wimedia device, the host 100 according to this embodiment causes the DBD to stop beacon transmission. Whether beacon transmission is unnecessary is determined based on whether the other Wimedia device can synchronize with the host based on beacons transmitted from another DBD or SBD if the beacon transmission of the DBD stops.

It is therefore possible to prevent the DBD from wastefully transmitting beacons and control the power consumption of each device included in the wireless communication network.

According to this embodiment, when a plurality of DBDs are redundantly transmitting beacons to a plurality of other Wimedia devices, the number of DBDs to perform beacon transmission can be minimized.

[Third Embodiment]

In the second embodiment, a DBD which should start beacon transmission and a DBD which should stop beacon transmission are distinguished, and the number of DBDs to perform beacon transmission in the wireless communication network is minimized, thereby suppressing the power consumption of each device included in the wireless communication network.

However, the present invention is not limited to this, and the power consumption can also be suppressed by shortening the beacon period.

FIG. 11 is a view showing the transition of a beacon slot occupied state which occurs upon executing the processing in FIGS. 9A and 9B described in the second embodiment.

A reference number 11a of FIG. 11 shows a state before transmission of a capture packet command (the state on the left side of 10a of FIG. 10, or the state before execution of step S604 in FIG. 9A).

As shown in 11a of FIG. 11, a DBD 1003 transmits a beacon in a beacon slot next to the beacon slot used by a host 100 for beacon transmission. Another Wimedia device 1001 transmits a beacon in a beacon slot next to that beacon slot.

A reference number 11b of FIG. 11 shows a state when a DBD 1005 starts beacon transmission, and the host 100 receives the beacon (the state at the center of 10a of FIG. 10, or the state in step S608 of FIG. 9B).

In 11b of FIG. 11, since the DBD 1005 transmits beacons, another Wimedia device 1002 also synchronizes with the host 100. The DBD 1005 transmits a beacon in a beacon slot next to the beacon slot used by the other Wimedia device 1001 for beacon transmission. The other Wimedia device 1002 transmits a beacon in a beacon slot next to that beacon slot.

A reference number 11c of FIG. 11 shows a state immediately after the DBD 1003 has stopped beacon transmission (the state on the right side of 10a of FIG. 10, or the state in step S903).

As shown in 11c of FIG. 11, when the DBD 1003 stops beacon transmission, the beacon slot used by the DBD 1003 for beacon transmission is no longer used.

A reference number 11d of FIG. 11 shows a state when a predetermined period has elapsed after the stop of beacon transmission of the DBD 1003. As shown in 11d of FIG. 11, the other Wimedia device 1002 transmits a beacon in the beacon slot which has become available due to the stop of beacon transmission of the DBD 1003. This allows shortening the beacon period. However, transition from the state in 11c of FIG. 11 to that in 11d of FIG. 11 takes a time, and the beacon period is wasted during that time. In this embodiment, a method of shortening the time required for shortening the beacon period, thereby effectively using the band will be described.

Reference numbers 12a to 12c of FIG. 12 are views showing the transition of a beacon slot occupied state according to this embodiment.

The reference number 12a of FIG. 12 shows a state before transmission of a capture packet command (the state on the left side of 10a of FIG. 10, or the state before execution of step S604 in FIG. 9A).

As shown in 12a of FIG. 12, the DBD 1003 transmits a beacon in a beacon slot next to the beacon slot used by the host 100 for beacon transmission. The other Wimedia device 1001 transmits a beacon in a beacon slot next to that beacon slot.

The reference number 12b of FIG. 12 shows a state when the DBD 1003 stops beacon transmission, and the DBD 1005 starts beacon transmission instead. The DBD 1005 which newly starts beacon transmission transmits a beacon in the beacon slot used by the DBD 1003 for beacon transmission.

The reference number 12c of FIG. 12 shows a state in which since the DBD 1005 starts beacon transmission, the other Wimedia device 1002 synchronizes with the host 100.

As described above, when a DBD which should start beacon transmission transmits a beacon in a beacon slot used by another DBD which should stop beacon transmission, the time required for minimizing the beacon period shortens. This enables effective use of the band.

It is therefore possible to suppress the power consumption of each device included in the wireless communication network.

[Other Embodiments]

A method of starting or stopping beacon transmission at the start of connection of a DBD has been described above. However, the host 100 can cause each connected DBD to capture a receivable signal at an arbitrary timing.

Hence, the host may cause each already connected DBD to periodically capture a reception signal, and determine the start/stop of beacon transmission based on a captured signal. This control allows an optimum DBD to transmit beacons even when, for example, another new Wimedia device is activated outside the wireless communication range of the host 100 but within the wireless communication range of a DBD.

The present invention is also applicable to a system including a plurality of devices (e.g., host computer, interface device, reader, and printer) or an apparatus (e.g., copying machine or facsimile apparatus) including a single device.

The object of the present invention is achieved even by supplying a storage medium which records software program codes for implementing the functions of the above-described embodiments to the system or apparatus. In this case, the functions are implemented by causing the computer (or CPU or MPU) of the system or apparatus to read out and execute the program codes stored in the storage medium. In this case, the storage medium which stores the program codes constitutes the present invention.

Examples of the storage medium usable to supply the program codes are a floppy® disk, hard disk, optical disk, magnetooptical disk, CD-ROM, CD-R, magnetic tape, nonvolatile memory card, and ROM.

The functions of the above-described embodiments are implemented not only when the computer executes the read-out program codes but also when, for example, the OS (Operating System) running on the computer partially or wholly executes actual processing on the basis of the instructions of the program codes.

The functions of the above-described embodiments are also implemented when the program codes read out from the storage medium are written in the memory of a function expansion board inserted into the computer or a function expansion unit connected to the computer. More specifically, after the program codes are written in the memory, the CPU of the function expansion board or function expansion unit partially or wholly executes actual processing on the basis of the instructions of the program codes, thereby implementing the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-076405, filed Mar. 24, 2008, which is hereby incorporated by reference herein in its entirety.

What is claimed is:

1. A communication apparatus, comprising:
a processor and a communication interface;
wherein the communication interface is configured to receive first information regarding devices which exist within a wireless communication range of first another communication apparatus and second information regarding devices which exist within a wireless communication range of second another communication apparatus which is transmitting a beacon; and
wherein the processor is configured to perform the functions of:
a first instruction unit configured to instruct said first another communication apparatus to transmit a beacon based on the first information and the second information; and
a second instruction unit configured to instruct, when the first instruction means instructs said first another communication apparatus to transmit a beacon, said second another communication apparatus being already transmitting a beacon to stop transmission of the beacon, based on the first information and the second information.

2. The communication apparatus according to claim 1, wherein the second instruction unit instructs to stop the transmission of the beacon for synchronizing the devices which exist within the wireless communication range of said second another communication apparatus with the communication apparatus.

3. The communication apparatus according to claim 1, wherein the processor is further configured to perform the functions of:
a recognition unit configured to recognize, based on the first information and the second information received by said reception unit, a device which exists outside a wireless communication range of the communication apparatus and within the wireless communication range of said first another communication apparatus and within the wireless communication range of said second another communication apparatus; and
a decision unit configured to determine, based on a recognition result of said recognition unit, whether or not to stop the transmission of the beacon by said second another communication apparatus.

4. The communication apparatus according to claim 1, wherein if all devices which exist within a wireless communication range of said first another communication apparatus and all devices which exist within a wireless communication range of said second another communication apparatus are overlapped, the second instruction unit instructs said second another communication apparatus to stop the transmission of the beacon.

5. The communication apparatus according to claim 1, wherein the communication apparatus is a host of a wireless USB, said first another communication apparatus and said second another communication apparatus are directed beaconing devices of the wireless USB.

6. A communication control method of a communication apparatus, comprising:
a reception step of receiving first information regarding devices which exist a wireless communication range of first another communication apparatus and second information regarding devices which exist within a wireless communication range of second another communication apparatus which is transmitting a beacon;
a first instruction step of instructing said first another communication apparatus to transmit a beacon based on the first information and the second information; and
a second instruction step of instructing, when instructing said first another communication apparatus to transmit a beacon at the first instruction step, said second another communication apparatus being already transmitting a beacon to stop transmission of the beacon, based on the first information and the second information.

7. A non-transitory computer-readable recording medium which when executed by a computer performs:
a reception step of receiving first information regarding devices which exist a wireless communication range of first another communication apparatus and second information
regarding devices which a wireless communication range of second another communication apparatus which is transmitting a beacon;
a first instruction step of instructing said first another communication apparatus to transmit a beacon based on the first information and the second information; and a second instruction step of instructing, when instructing said first another communication apparatus to transmit a beacon at the first instruction step, said second another communication apparatus being already transmitting a beacon to stop transmission of the beacon, based on the first information and the second information.

* * * * *